United States Patent [19]

Baerresen et al.

[11] 3,797,785

[45] Mar. 19, 1974

[54] THRUST MODULATING APPARATUS

[75] Inventors: Richard B. Baerresen, Bonita; Richard H. Timms, San Diego, both of Calif.

[73] Assignee: Rohr Industires, Inc., Chula Vista, Calif.

[22] Filed: Aug. 31, 1972

[21] Appl. No.: 285,339

[52] U.S. Cl.......... 244/53 R, 239/265.31, 244/12 D
[51] Int. Cl............................................ B64c 15/04
[58] Field of Search.... 244/12 R, 12 A, 12 D, 23 R, 244/23 D, 52, 53; 239/265.19, 265.27, 265.29, 265.31, 265.33, 265.35, 265.37, 265.39, 265.41; 60/226, 242

[56] References Cited
UNITED STATES PATENTS

| | | | |
|---|---|---|---|
| 3,500,646 | 3/1970 | Hom et al. | 239/265.31 |
| 3,500,644 | 3/1970 | Hom et al. | 239/265.31 |
| 3,541,794 | 11/1970 | Johnston et al. | 239/265.31 |
| 3,347,467 | 10/1967 | Carl et al. | 239/265.37 |
| 3,511,055 | 5/1970 | Timms | 239/265.31 |
| 3,603,090 | 9/1971 | Billinger et al. | 239/265.29 |

FOREIGN PATENTS OR APPLICATIONS

| | | | |
|---|---|---|---|
| 1,458,200 | 10/1966 | France | 239/265.31 |

*Primary Examiner*—Duane A. Reger
*Assistant Examiner*—Jesus D. Sotelo

[57] ABSTRACT

Fan jet engine has cowl surrounding engine and terminating in jet exhaust nozzle. Elongate shroud surrounds fan and engine to define annular passage for fan air terminating forward of exit end of nozzle. Aft portion of shroud is a separate sleeve movable axially to define a peripheral outflow gap for fan air. A ring of reverse thrust cascades is located in the gap, and a set of blocker doors are pivoted at their aft ends adjacent to the aft end of the cascade ring. In stowed position they overlie the inner side of the cascade ring and block lateral outflow. In deployed position they converge forward to block rearward flow of air and to divert it out through cascade ring. The sleeve in stowed position overlies the outer side of the cascade ring and prevents inflow, while its trailing edge is in the plane of maximum size of the core to define a convergent nozzle for cruising operation. The sleeve shifts partially aft to a position defining a larger nozzle exit area for takeoff and landing, with the blocker doors stowed and latched. Final deployment of the sleeve releases the latches and positively moves the doors to deployed position. Initial stowing movement of the sleeve positively stows the doors and positively secures the latches.

5 Claims, 12 Drawing Figures

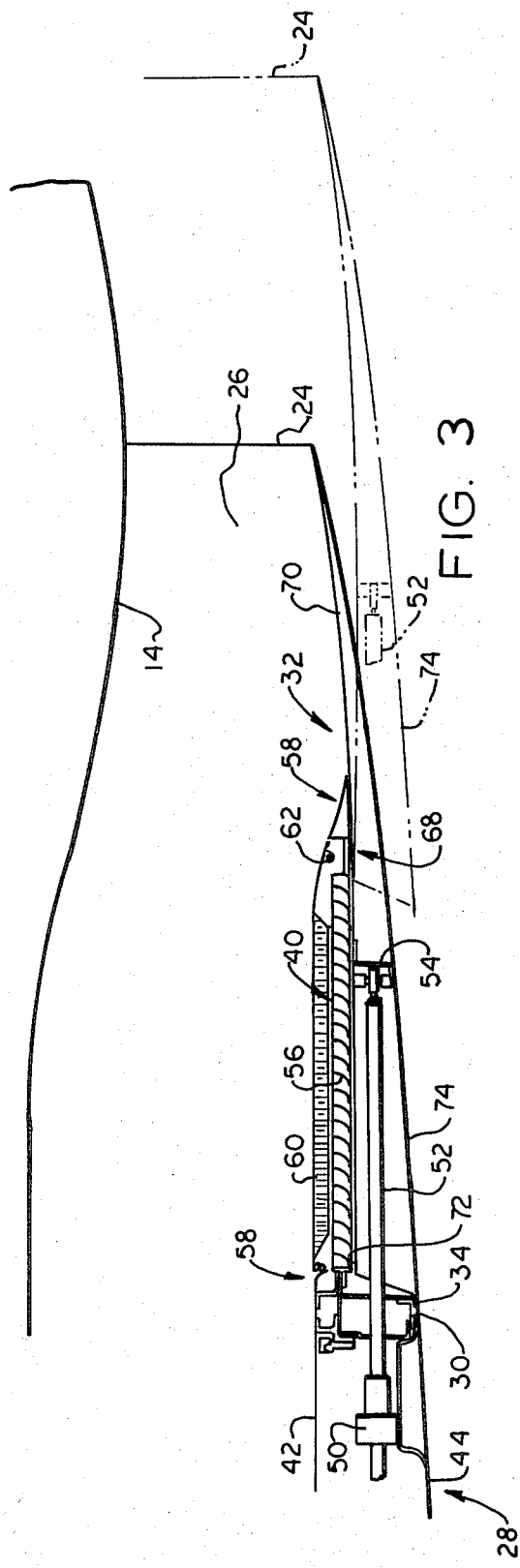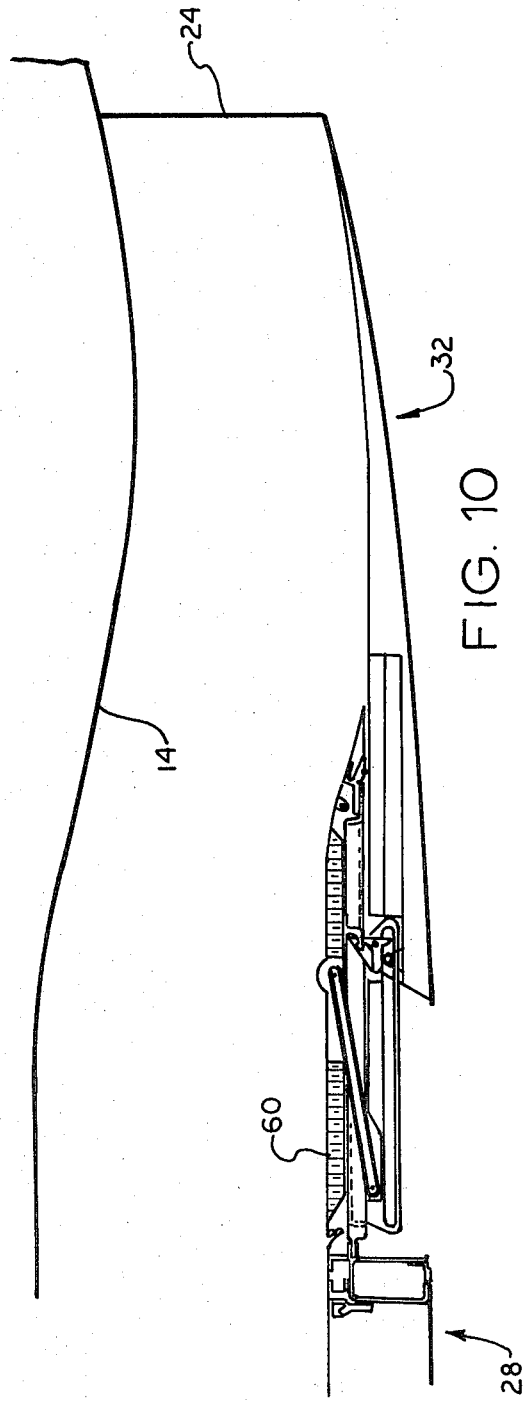

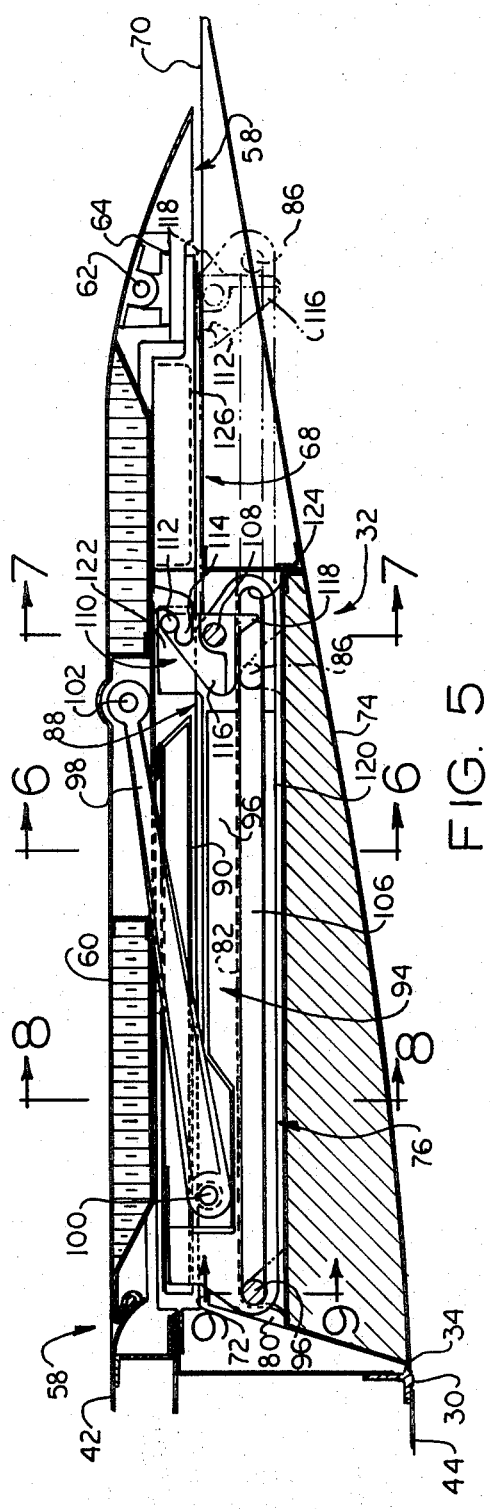
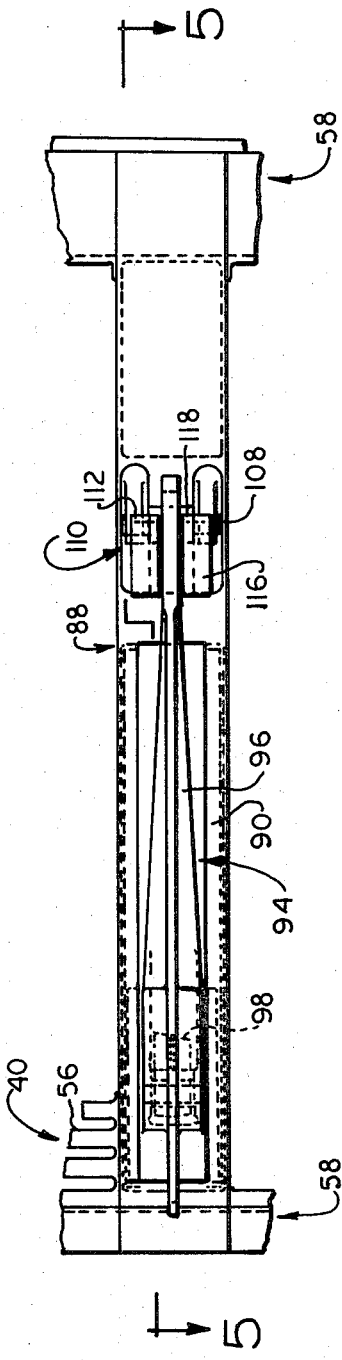
FIG. 5
FIG. 4

THRUST MODULATING APPARATUS

BACKGROUND OF THE INVENTION

This invention lies in the field of gas turbine engines, commonly called jet engines, which produce reaction thrust by ejecting a high velocity stream of gas from the exhaust nozzle of the gas turbine, and is directed to thrust reversing apparatus primarily for the fan type of jet engine in which a nacelle or shroud surrounds the engine and is spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the turbine.

As in the case with all jet type engines, the airplanes which are equipped with them have high landing speeds which place a heavy burden on the wheel brakes. To reduce this burden, most airplanes are provided with means to reverse the direction of flow of the jet stream during landing runs to produce a reverse thrust. Many different types of thrust reversers have been developed and used for this purpose. All of them utilize a basic principle of blocking rearward flow of the jet stream and diverting it laterally and forwardly. One type uses blocker doors swung directly behind the jet nozzle and diverging forwardly. Another type uses openings in the side walls of the nozzle or a surrounding shroud together with blocker doors which swing toward the engine axis to block rearward flow and extend outward to direct the diverted flow laterally and forwardly. Still another type utilizes cascade sets in the side walls of the jet or shroud with various means to block rearward flow and uncover the cascades. All of these have various merits and have been used successfully. Their principal problems have been cost, weight, and complexity with resultant high maintenance expense. Moreover, they have no suitable arrangements for modifying the jet stream nozzle area to provide optimum thrust conditions for takeoff and landing operation.

SUMMARY OF THE INVENTION

The present invention obtains the benefits mentioned above, including the nozzle area modification, while providing an apparatus which adds very little weight or complexity and is highly reliable in operation. Generally stated, the apparatus includes an elongate shroud which surrounds the fan and engine and provides an annular passage for fan air, the passage terminating forward of the exit and of the turbine exhaust nozzle. The shroud includes a fixed main body and an aft section in the form of an axially movable sleeve. The main body is mounted on a fixed support which also carries the sleeve for axial sliding movement, forward to stowed position in sealing relation with the main body, and aft to deployed position defining a peripheral outflow gap between the main body and the sleeve.

A substantially complete cascade ring is arranged in the outflow gap so that air flowing out through the gap will be given a forward component to peoduce reverse thrust. A series of blocker doors are pivoted at their aft ends adjacent to the aft end of the cascade ring to swing about transverse axes between stowed positions overlying the inner side of the cascade ring to block outflow and deployed positions converging forward to block axial flow of fan air and divert it out through the cascade ring. A series of latches are provided to positively hold the blocker doors in stowed position. The sleeve is provided with a series of actuators for the latches and doors. When the sleeve is moved to a first position of partial deployment if provides an enlarged fan air nozzle exit area for optimum thrust in takeoff or landing. In final movement of the sleeve to fully deployed position the actuators contact the latches to release them and then contact the controllers for the doors to positively cause them to deploy the doors. In the initial portion of stowing movement of the sleeve, the actuators positively move the controllers to stow the doors and then positively move the latches to locking position. The forward portion of the sleeve in stowed position overlies the outer side of the cascade ring to block inflow of air and to form a smooth streamlined continuation of the main body.

BRIEF DESCRIPTION OF THE DRAWINGS

Various other advantages and features of novelty will become apparent as the description proceeds in conjunction with the accompanying drawings, in which:

FIG. 3 is a schematic sectional view showing the means for translating the sleeve;

FIG. 4 is a schematic plan vew of the apparatus for operating the blocker doors;

FIG. 5 is a schematic view taken on line 5—5 of FIG. 4;

FIG. 10 is a schematic view similar to FIG. 5 but showing the sleeve in partially deployed position;

DESCRIPTION OF PREFERRED EMBODIMENTS

Figure 1:
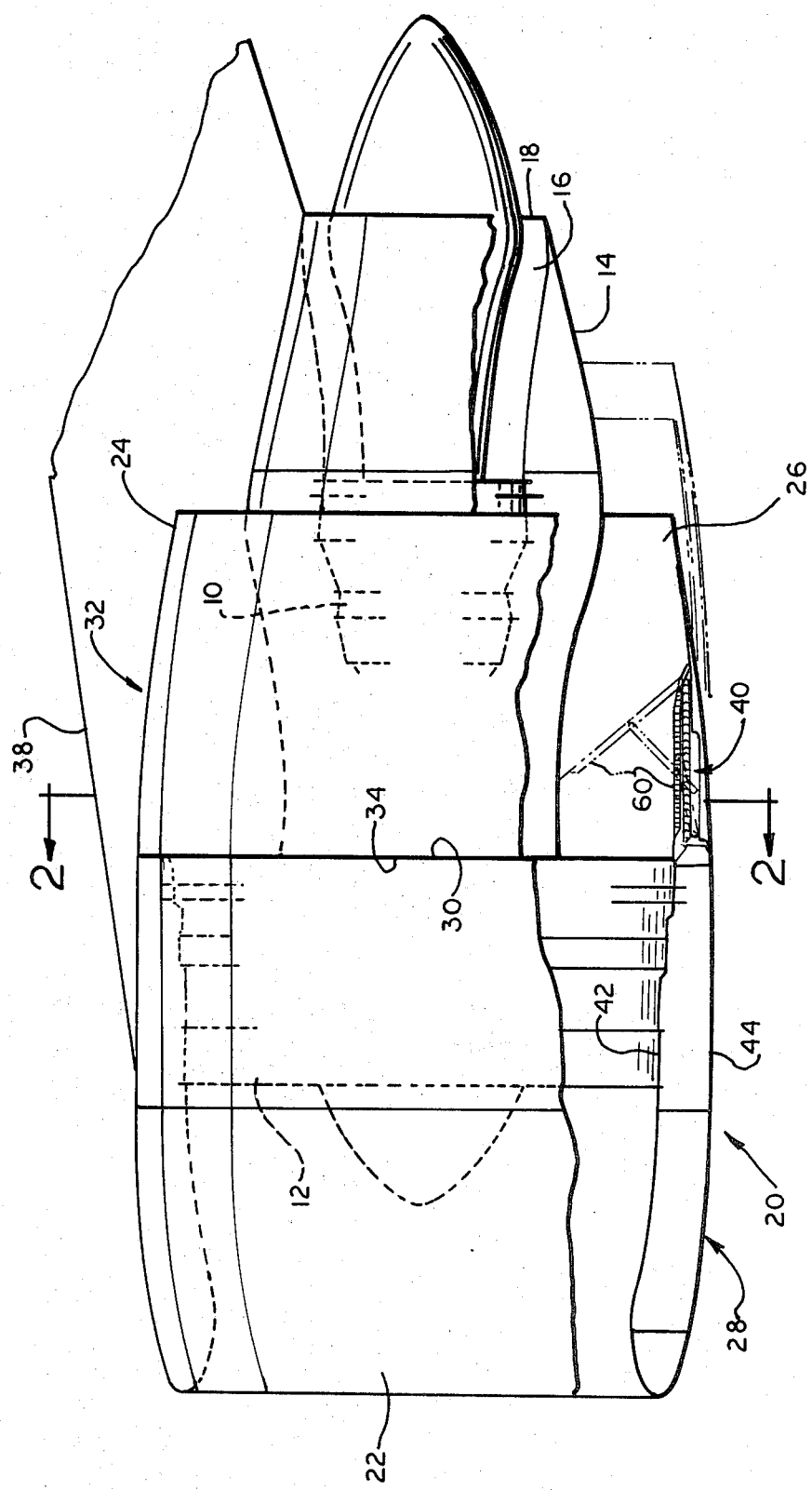
FIG. 1 is a schematic side elevational view showing a complete engine installation with the sleeve in stowed position.

The apparatus of this invention is generally schematically illustrated in FIG. 1, in which the engine 10 is provided with a fan 12. A cowl 14 terminates rearwardly in a discharging exhaust gas nozzle 16 having an exit end 18. An elongate shroud 20, which is generally coaxial with the engine, surroudns the engine and fan with its forward end 22 well ahead of the fan to constitute an air inlet and its aft end 24 terminating forward of the exit end 18 of the nozzle. As shown, it terminates substantially at the transverse plane of maximum diameter or area of the engine cowl, which converges forwardly and rearwardly of such plane, to define a convergent jet air flow nozzle 26 for the air which is directly driven rearwardly by the fan and does not pass through the turbine.

The shroud actually includes two distinct sections. The larger, forward, main body 28 is fixed with respect to the engine and fan and has an aft edge 30 lying in a generally transverse plane. The aft section is in the form of a sleeve 32 having a leading edge 34 adapted to mate with aft edge 30 when the sleeve is in stowed position as shown in solid lines. The sleeve is slidably supported on guide tracks for axial movement to the first, partially deployed position shown in broken lines for takeoff and landing, and to the second, fully deployed position shown in broken lines to open a peripheral gap 36 (FIG. 12) for outflow of fan air during thrust reversal.

Figure 2:
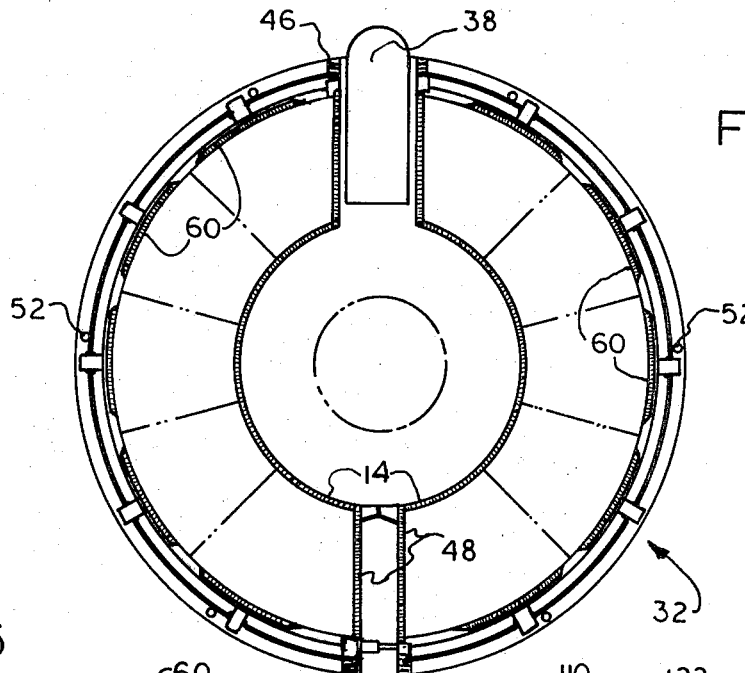
FIG. 2 is a schematic sectional view taken on line 2—2 of FIG. 1.

As will be seen in FIG. 2, the engine, cowl, and shroud are all supported on a pylon 38 which is suitably secured to a structural member of a wing or other part of an airplane. A substantially complete cascade ring 40 is secured to the main body 28 and extends rearward therefrom a distance approximately equal to the axial extent of gap 36 and is located between the rearward projections of inner and outer walls 42 and 44 of the main body. Guide tracks 46 on pylon 38 and structure 48 support the sleeve 32 in its axial movement, which is provided by a series of actuators 50 and shafts 52 peripherally spaced around and shroud. In FIG. 3 it will be seen that the actuators 50 are mounted in the main body and shafts 52 are connected to structural members 54 in the sleeve. The vanes 56 in the cascade ring, shown in FIG. 3, are spaced and shaped to provide a forward component in the fan air flow outward therethrough.

Figure 11:
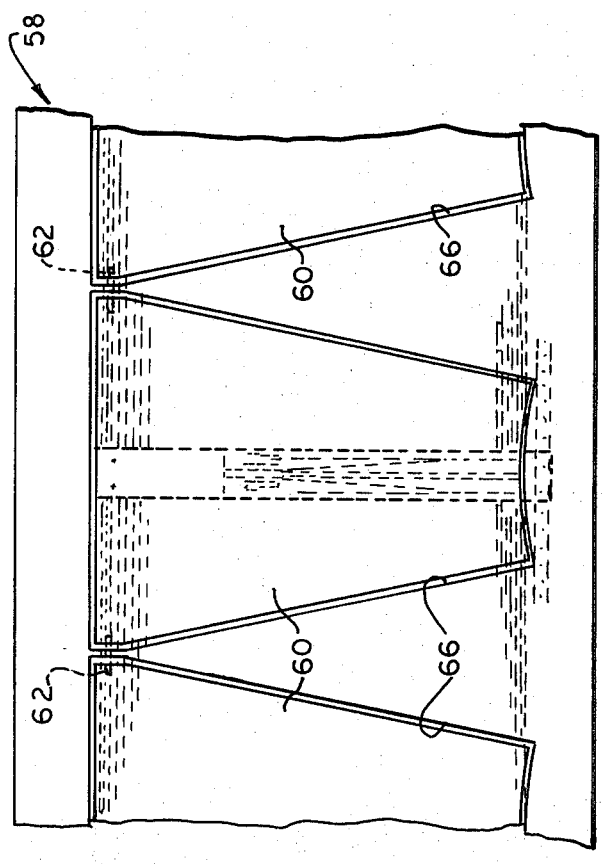
FIG. 11 is a schematic plan view of a blocker door mounted in a support ring.

The principal parts of the apparatus are shown in some detail in FIGS. 4 and 5, where it will be seen that a support ring 58 extends peripherally between pylon 38 and structure 48 at each side of the center line. This ring supports both the cascade ring and the blocker doors 60. The latter are pivotally mounted at their aft ends adjacent to the aft end of the cascade ring by pivots 62 to brackets 64 carried by the support ring, and are swingable about transverse axes between the solid line stowed position of FIG. 5 and the broken line deployed position of FIG. 1, converging forwardly in contact with the cowl to block rearward flow of fan air and divert it through the outflow gap 36. The support ring, as shown in FIG. 11, has generally trapezoidal shaped apertures 66 conforming to the blocker doors so that the latter fit in the apertures when stowed, overlying the inner side of the cascade ring and preventing outflow.

The stowed blocker doors are substantially flush with the inner wall 42 of the main body to form a smooth streamlined continuation thereof, as best seen in FIG. 3. In this figure it will also be noted that the inner wall 68 of the sleeve has an aft portion 70 which forms a smooth streamlined continuation of the doors and the support ring in stowed position, while the forward portion 72 of wall 68 closely overlies the outer side of the cascade ring to prevent inflow of air. The sealing is complete because of the contact of forward edge 34 of outer wall 74 with the aft edge 30 of wall 44.

Figure 12:
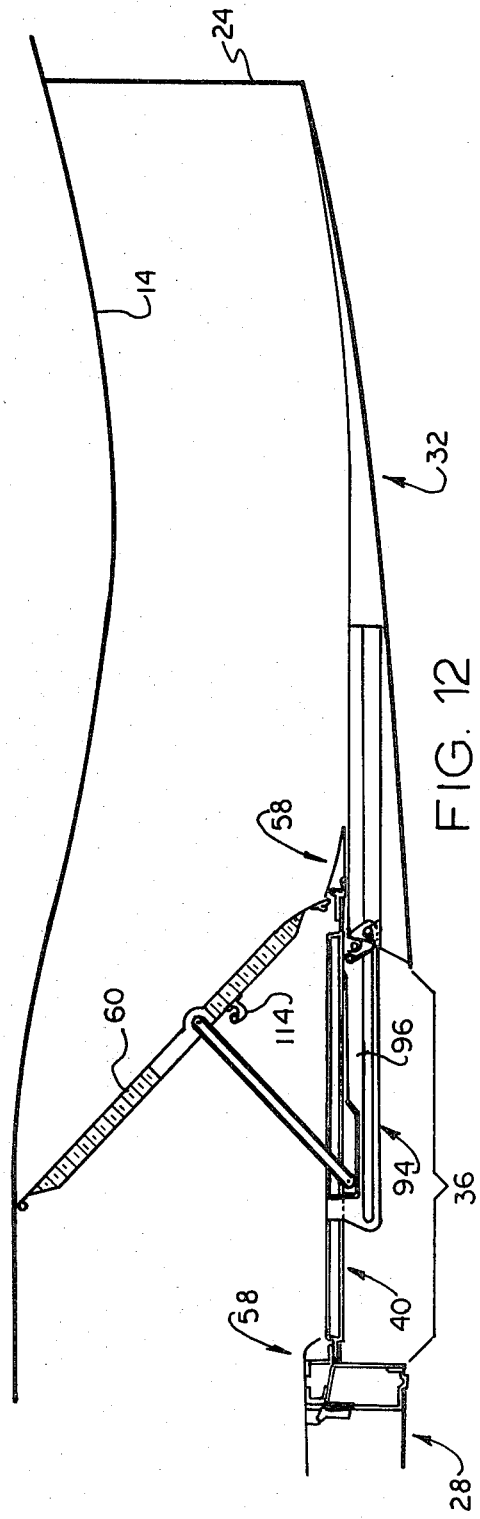
FIG. 12 is a schematic view similar to FIG. 5 but showing the sleeve in fully deployed position and a blocker door in fully deployed position.

As previously noted, sleeve 34 may be partially deployed to an intermediate position for optimum thrust conditions in takeoff and landing operations. This position is illustrated in FIG. 10, where it will be seen that trailing edge 24 is well aft of the plane of maximum area or dimension of cowl 14 to substantially increase the nozzle exit area. At this point the blocker doors are still completely closed and latched to prevent flow through the cascade ring, and full power may be used for forward thrust. The fully deployed position of the sleeve is illustrated in FIG. 12, and it will be seen that the forward portion of the sleeve has fully uncovered the cascade ring, and the blocker doors have been unlatched and fully deployed to produce reverse thrust.

Figure 7:
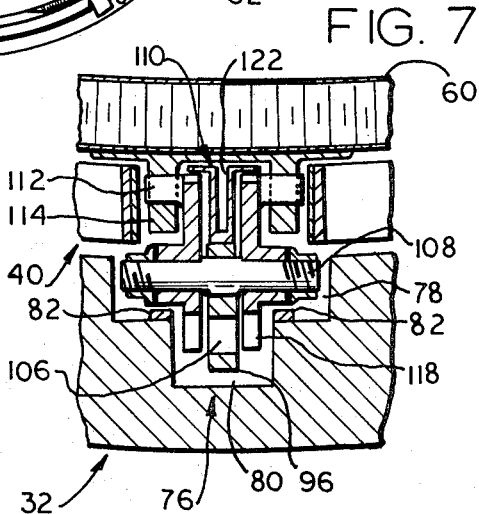
FIG. 7 is a schematic view taken on line 7—7 of FIG. 5.
Figure 8:
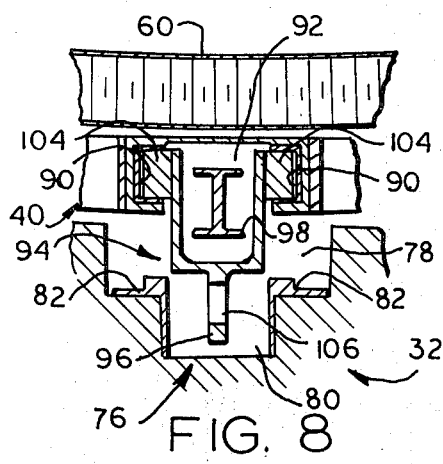
FIG. 8 is a schematic view taken on line 8—8 of FIG. 5.
Figure 9:
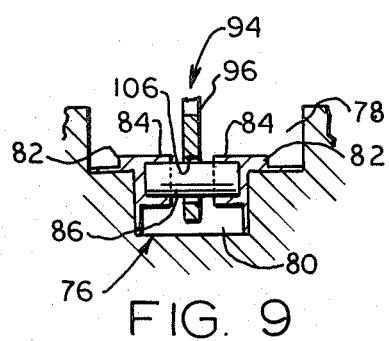
FIG. 9 is a schematic view taken on line 9—9 of FIG. 5.

To accomplish the above, the forward portion 72 of the inner wall 68 of sleeve 32 is provided generally centrally of each blocker door with an axially extending dual width recess 76 having a wide upper channel 78 and a narrow lower channel 80 as seen in FIGS. 6 to 9, the channels extending somewhat less than the axial length of the cascade ring. A retainer track 82, which is mounted at each intersection of the upper channel with the lower channel, has an angle cross section, and extends substantially the full length of the recess. As seen in FIGS. 5 and 9, bracket means 84 are formed on the tracks just short of the extreme forward end of the recess and hold an actuator in the form of a cross pin 86. As seen in FIG. 5, the tracks terminate immediately forward of the actuator.

Figure 6:
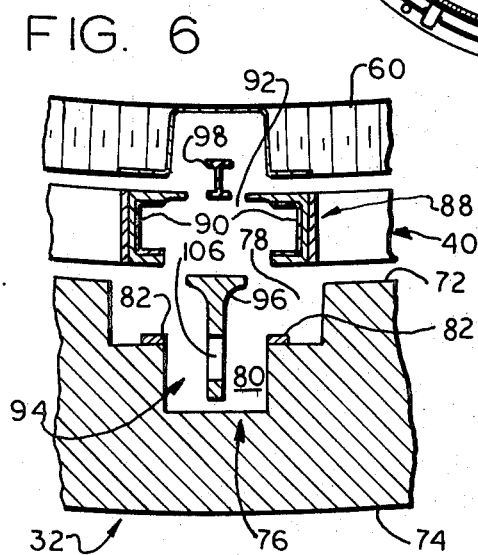
FIG. 6 is a schematic view taken on line 6—6 of FIG. 5.

An axially extending support member 88 is connected to the fore and aft margins of support ring 58 substantially centrally of each blocker door and in radial, parallel alignment with each recess 76. It is in the same plane as the cascade ring and divides it into a plurality of segments. A major portion of the length of the member, starting adjacent to its forward end, comprises a pair of laterally spaced, inwardly concave, channel shaped guide tracks 90 defining between them a slot 92 through the cascade ring, as seen in FIGS. 6 and 8.

A controller 94 is provided for each blocker door and includes an elongate axially extending member 96 and a link 98 pivoted at its first end to the forward portion of member 96 at 100 and pivoted at its second end to an intermediate point on the blocker door at 102. Member 96 is channel shaped at its forward portion to receive link 98 and the channel portion has laterally extending sliders 104 to slidably engage in guide tracks 90. When member 96 slides aft, it causes link 98 to swing the door to deployed position. Member 96 is also formed with an elongate slot 106 extending substantially from end to end. As will be seen in FIG. 9, actuator 86 slides in this slot.

Referring to FIGS. 5 and 7, member 96 at its aft end 120 carries a cross axle 108, on each end of which is pivotally mounted a latch 110. The body of the latch is provided with a first detent 112 which engages with a depending hook 114 on door 60 to positively restrain it against any deploying movement. It is also provided with a second detent 116 in the form of a flat cam-like arm. This detent is engaged by retainer track 82 which prevents if from rotating counter clockwise. It cannot rotate clockwise because of its engagement with hook 114. It is further provided with a depending lever 118 which lies in the path of movement of actuator 86. Aft end 120 of member 96 cannot move radially outward because the latch is in engagement with retainer track 82. It cannot move radially inward because it is in engagement with track member 122 which is fixed to support member 88. Member 96 cannot move aft because latch 110 is in engagement with hook 114.

With the components in the position of FIG. 5, the sleeve is fully stowed and the blocker door are fully stowed and latched. The nozzle exit is substantially in the plane of maximum area or dimension of the cowl to produce a convergent nozzle for cruising operation.

When it is desired to adjust the apparatus for takeoff or landing, with an enlarged nozzle exit area as shown in FIG. 10, the sleeve in FIG. 5 is moved aft to a first intermediate position, with the actuator 86 sliding aft in slot 106 until it reaches the first broken line position of FIG. 5 just forward of lever 118 and out of contact with it. At this point, detent 116 is still in engagement with retainer track 82 and will not release hook 114 and door 60. Thus the nozzle is wide open with an enlarged exit area, and maximum power may be used.

When it is desired to adjust the apparatus for thrust reversal as shown in FIG. 12, the sleeve in FIG. 5 is moved to its full deployment and the actuator is moved aft to the second broken line position. Since track 82 terminates directly at the forward edge of the actuator pin 86, it will move out of contact with second detent 116 substantially simultaneously with the contact of the actuator with lever 118 and will no longer prevent the latch from rotating. Continued aft movement of actuator 86 swings lever 118 upward and rearward, causing the latch to rotate counter clockwise and disengage detent 112 from hook 114, thus releasing door 60 for deployment. The actuator then contacts the aft end 124 of slot 106 to positively drive the controller rearward. This in turn causes link 98 to move door 60 to deployed position. As the latch moves rearward, detent 112 underlies a plate portion 126 of support member 88 and is prevented from rotating clockwise.

When it is desired to return the components to stowed position, the sleeve is moved forward. During the initial portion of the stowing movement, actuator 86 pushes forward against detent 116. The latch cannot rotate because of the contact of detent 112 with plate portion 126. Therefore the entire controller is positively moved forward, and link 98 positively pulls door 60 back to its stowed position. When the controller reaches its full forward position, detent 112 moves out of its restraining contact with plate portion 126, and the continuing pressure of the actuator on detent 116 rotates the latch positively into engagement with hook 114, also locking the controller in its forward position. Actuator 86 now moves without interruption to the forward end of the slot 106, and the sleeve again overlies the outer side of the cascade ring, putting the apparatus back in cruising condition.

We claim:

1. Thrust modulating apparatus for use in combination with a jet engine, comprising:
   a streamlined shroud surrounding the engine and including a fixed forward main body and an aft section in the form of a sleeve axially movable toward and away from the main body to stored and deployed positions;
   the aft edge of the outer wall of the main body lying generally in a transverse plane;
   the leading edge of the outer wall of the sleeve being adapted to mate with the aft edge of the outer wall of the main body to define a smooth continuous streamlined outer contour;
   support means to carry the sleeve for axial movement;
   power means carried by the main body to move the sleeve between stowed and deployed positions including at least one intermediate position;
   the leading edge of the sleeve in fully deployed position being axially spaced a predetermined distance from the aft edge of the main body to produce a peripheral gap for outflow of gases;
   a substantially complete peripheral ring of reverse flow cascades extending aft of the main body a distance substantially equal to the axial length of the outflow gap;
   a plurality of blocker doors pivotally mounted at their aft ends adjacent to the aft end of the cascade ring for swinging on transverse axes between stowed positions generally parallel to and overlying the inner side of the cascade ring and deployed positions converging forward to block rearward flow of gases and to divert them outward through the cascade ring;
   the forward portion of the sleeve in stowed position overlying the outer side of the cascade ring and closing the outflow gap;
   a controller for each blocker door to swing it between stowed and deployed positions;
   a latch for each blocker door to positively retain it in stowed position;
   a dual purpose actuator for each blocker door carried by the sleeve and positioned thereon to contact and release the latch upon movement of the sleeve from stowed position to a first intermediate position and to contact the controller upon movement to a further deployed position, and to actuate the controller in response to further deploying movement of the sleeve to swing the door to deployed position;
   a plurality of axially extending support members are provided in the cascade ring with one member located substantially centrally of each blocker door;

each support member comprises a pair of laterally spaced axially extending guide tracks defining a slot through the cascade ring;
   each controller comprises an elongate axially extending member having its forward portion slidably mounted in the guide tracks, and a link pivotally connected at its first end to the forward portion of the elongate member and at its second end to an intermediate point on the door;
   and the link extends and moves through the slot defined by the spaced guide tracks.

2. Apparatus as claimed in claim 1; wherein
   the actuator is arranged to contact the latch and return it to latching position and drive the controller to return the blocking door to stowed position during the initial portion of the movement of the deployed sleeve toward its stowed position.

3. Apparatus as claimed in claim 1; wherein
   a cowl is provided to surround the engine, and the shroud is spaced radially outward from the cowl;
   the latter is generally annular in cross section with its maximum dimension in a transverse plane located a predetermined distance forward of its aft end and converging forward and aft from that location;
   the trailing edge of the sleeve in fully stowed position being substantially at the plane of maximum dimension of the cowl to define a convergent nozzle for cruising operation;
   the sleeve being deployable to an intermediate position for takeoff and landing operation with its trailing edge well aft of the plane of maximum dimension to define a substantially enlarged nozzle exit area with the actuators out of contact with the latches and with the blocker doors stowed and latched to prevent inflow or outflow of gases through the gap;

and the sleeve being further movable to a fully deployed position with the actuators releasing the latches and causing deploy-ment of the blocker doors during such movement.

4. Apparatus as claimed in claim 1; wherein the latch is pivotally mounted on a transverse axis on the aft end of the elongate member and is provided with a first detent to positively engage the blocker door to retain it in stowed position, and is also provided with a second detent;

the sleeve is provided with an elongate axially extending retainer track slidably engaging the second detent to retain the latch in latching position, and the actuator is located at the forward end of the retainer track;

and the latch is further provided with a lever for engagement by the actuator;

the sleeve being movable from stowed position to a predetermined degree of deployment to move the retainer track out of restraining contact with the second detent and substantially simultaneously move the actuator into contact with the lever to rotate the latch to release position;

the sleeve being further movable to cause the actuator to contact the aft end of the elongate member to move it rearward and deploy the blocker doors.

5. Apparatus as claimed in claim 4; wherein the elongate member is formed with an elongate slot extending substantially from end to end of the member;

the actuator is a cross pin slidably engaging in the slot;

and the cross pin is adapted to enter into driving engagement with the member by contact with the aft end of the slot.

* * * * *